(12) United States Patent
Kim et al.

(10) Patent No.: US 7,873,050 B2
(45) Date of Patent: Jan. 18, 2011

(54) APPARATUS AND METHOD FOR DOWNLINK PACKET SCHEDULING IN BASE STATION OF A PORTABLE INTERNET SYSTEM

(75) Inventors: Ju-Hee Kim, Daejeon (KR); Kyung-Soo Kim, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

(*) Notice: Subject to any disclaimer, the term of this patent is extended or adjusted under 35 U.S.C. 154(b) by 891 days.

(21) Appl. No.: 11/598,588

(22) Filed: Nov. 13, 2006

(65) Prior Publication Data

US 2007/0121636 A1    May 31, 2007

(30) Foreign Application Priority Data

Nov. 11, 2005    (KR)    ...................... 10-2005-0107961

(51) Int. Cl.
*H04L 12/28* (2006.01)
*H04J 3/16* (2006.01)

(52) U.S. Cl. ...................................... 370/392; 370/468
(58) Field of Classification Search ........................ None
See application file for complete search history.

(56) References Cited

U.S. PATENT DOCUMENTS

| 7,006,472 | B1* | 2/2006 | Immonen et al. ............ 370/332 |
| 7,190,684 | B2* | 3/2007 | Cao et al. .................... 370/335 |
| 2005/0030911 | A1 | 2/2005 | Tiedemann, Jr. et al. |
| 2005/0094675 | A1 | 5/2005 | Bhushan et al. |
| 2005/0152373 | A1 | 7/2005 | Ali |
| 2006/0146751 | A1* | 7/2006 | Obuchi et al. ............... 370/331 |
| 2006/0268692 | A1* | 11/2006 | Wright et al. ............... 370/229 |
| 2007/0070894 | A1* | 3/2007 | Wang et al. ................. 370/230 |

FOREIGN PATENT DOCUMENTS

| JP | 2003-209887 | 7/2003 |
| KR | 1020040099908 | 12/2004 |
| KR | 1020050052594 | 6/2005 |
| KR | 1020050063415 | 6/2005 |
| KR | 1020050069384 | 7/2005 |
| KR | 1020050077224 | 8/2005 |
| WO | WO 03/017572 | 2/2003 |

* cited by examiner

*Primary Examiner*—Daniel J Ryman
*Assistant Examiner*—John Blanton
(74) *Attorney, Agent, or Firm*—The Farrell Law Firm, LLP

(57) ABSTRACT

In a base station of an IEEE 802.16 Wireless MAN-based portable Internet system, a forward packet scheduling method and apparatus is provided. The portable Internet system portable Internet service includes a user terminal AT for providing a portable Internet service, a base station AP for supporting an inter-user terminal wireless access and network connection, and a packet access router PAR for performing a mobility control and packet routing function of each user terminal AT. The forward packet scheduler includes a packet-based subsidiary scheduling part for considering a real-time service and a user-based scheduling part for ensuring fairness and increasing system efficiency (throughput). After finishing the 2-step scheduling, the generated frame data are transmitted though a physical layer to a wireless user terminal. Therefore, with such a structure, the forward packet scheduling method may guarantee a maximum of system efficiency and fairness according to each user's QoS requirements, and may also guarantee a delay performance for a real-time service.

13 Claims, 6 Drawing Sheets

W$_i$(k) : Packet delay of HOL for connection (i) of (k)th frame
DRC$_i$(k) : Dynamic Rate Control
A$_i$(k) : Averaged Data Rate
$\gamma_i$ : as for Premiliary Scheduling, Weighting factor for connection (i), QoS parameter
$\eta_j$ : as for Main Scheduling, weighting factor for AT(j)(= $\rho_j$·R$_t$, R$_t$: Total Target Service Rate for that AT)
N : Number of connections with backlogged traffic, (k)th frame
M : Number of User with backlogged traffic, (k)th frame

APPARATUS AND METHOD FOR DOWNLINK PACKET SCHEDULING IN BASE STATION OF A PORTABLE INTERNET SYSTEM

This application claims priority under 35 U.S.C. §119 to a Korean application filed in the Korean Intellectual Property office on Nov. 11, 2005 and allocated Serial No.10-2005-0107961, the contents of which are incorporated herein by reference.

BACKGROUND OF THE INVENTION

1. Field of the Invention

The present invention relates to a forward (downlink) packet scheduling method and apparatus in a base station of a portable Internet system, and more particularly, the present invention relates to a forward packet scheduling method and apparatus in a base station of an IEEE 802.16 Wireless MAN-based portable Internet (WiBro) system.

2. Description of the Related Art

The IEEE 802.16 Wireless Metropolitan Area Network (MAN)-based (WiBro) system is a 3.5 Generation mobile communication system providing image and high-speed packet data transmission such as various IP-based wireless data services (streaming video, mail, chafting) that the wired Internet provides, using a wireless transmission technology ensuring a spectrum use efficiency in a 2.3 GHz frequency bandwidth.

Figure 1:
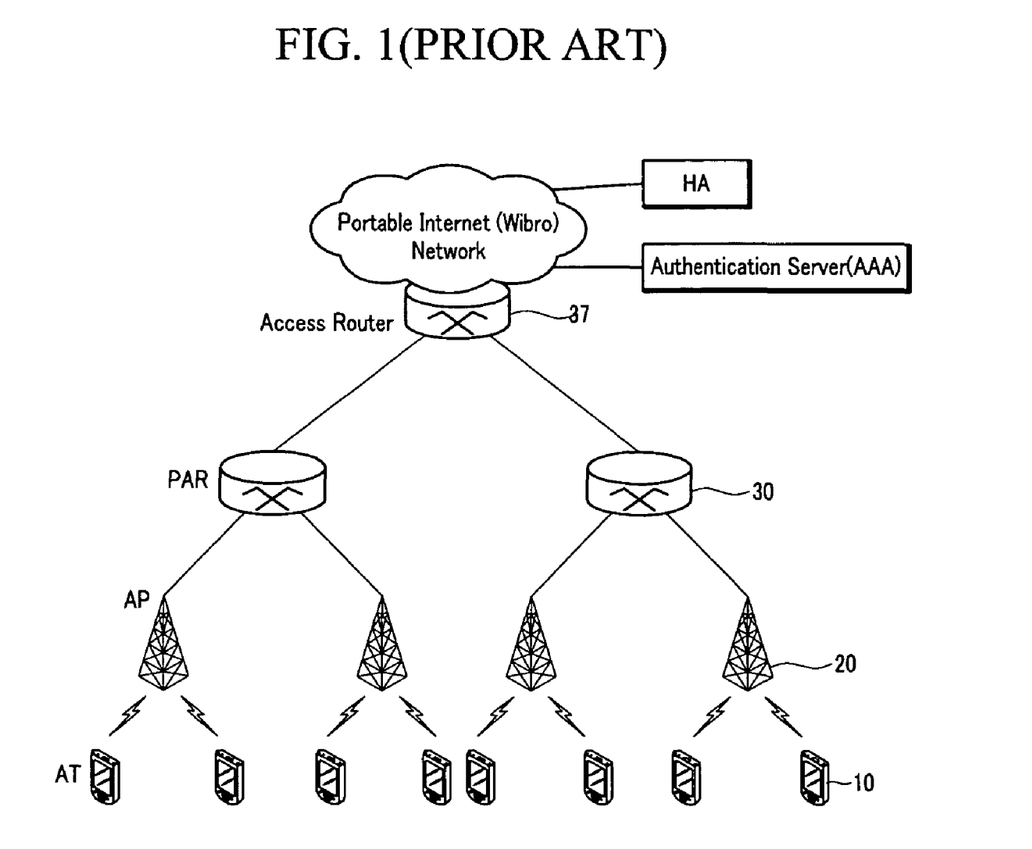
FIG. 1 is a schematic diagram of a conventional portable Internet (WiBro) system.

FIG. 1 is a schematic diagram of a conventional portable Internet (WiBro) system.

As shown in FIG. 1, a WiBro (Wireless Broadband) system includes a user terminal (also known as Access Terminal or "AT") for using a portable Internet service, a base station 20 (also known as Access Point or "AP") supporting a wireless access and network connection between the user terminals 10, and a packet access router 30 ("PAR") for performing an each-terminal mobility control and packet routing function.

The user terminal 10 may receive a wireless data service after the user terminal is recorded at the base station 20. In addition, the user terminal 10 may configure a plurality of traffic connections having different Quality of Service (QoS) requirements through a negotiation with the base station 20 so as to connect services having different service characteristics such as a web connection and FTP.

The base station 20 performs access control of the user terminal 10, packet mapping between the wired and wireless areas, wireless transmitting/receiving control, and wireless band management.

The packet access router (PAR) 30 performs an each-user-terminal mobility control and packet routing function.

The WiBro system transmits/receives data every frame so as to support high speed packet data transmission in the wireless area, and is operated based on an OFDM/FDMA/TDD (Orthogonal Frequency Division Multiplexing/Frequency Division Multiple Access/Time Division Duplex) wireless transmission scheme.

Figure 2:
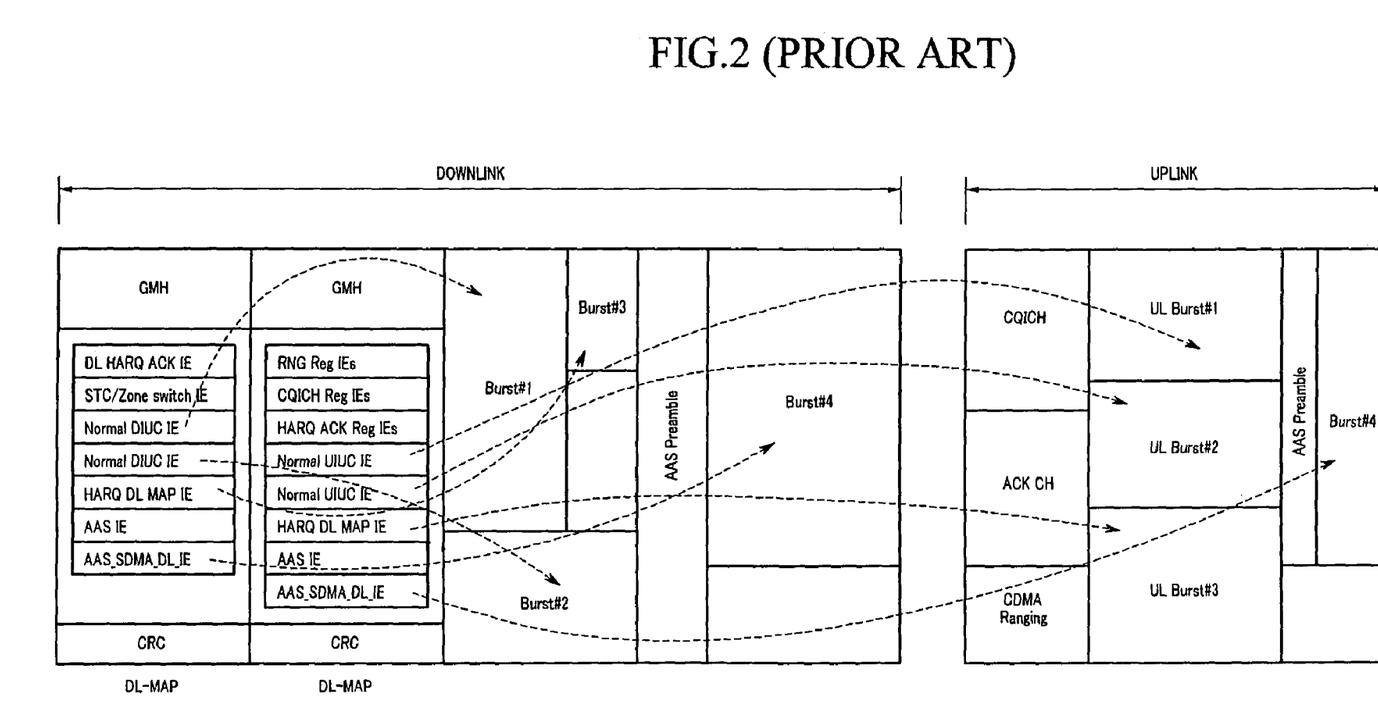
FIG. 2 is a schematic diagram of a wireless frame of a portable Internet (WiBro) system.

FIG. 2 is a schematic diagram of a wireless frame of a portable Internet (WiBro) system.

A frame includes a downlink (DL) frame and an uplink (UL) frame. The respective frames transmit a MAP message including frame configuration information at the leading part thereof and then transmit a data burst. Therefore, a scheduler for performing wireless management allocates/manages a sub-channel so as to transmit the respective user data every frame and configures a MAP message based on the sub-channel-related information.

The MAP message includes a DL-MAP for downstream traffic and a UL-MAP for upstream traffic, and each MAP includes a GMH (Generic MAC Header), IE (Information Element) informing data burst information, and CRC (Cyclic Redundancy Check). The IE defines a data region, stores each data region information (which are needed in each data region), and informs of each data region information.

Among the respective IEs, Normal DIUC (DL Interval Usage Code) IE, Hybrid Automatic Repeat Request (HARQ) DL MAP IE, Normal UIUC (UL Interval Usage Code) IE, HARQ UL MAP IE, etc. refers to data burst contents and includes information about which user receives the same or similar information.

The uplink frame includes Channel Quality Indicator Channel (CQICH), Acknowledge Channel (ACKCH), and Code Division Multiple Access (CDMA) ranging in an uplink control symbol (UL control symbol). A CDMA ranging channel includes information for a random access using CDMA code, the CQICH ranging is for adaptive modulation, and the ACK is ACK information for HARQ.

According to the OFDM/FDMA/TDD scheme, data transmitting/receiving is performed by a sub-channel, wherein the sub-channel is configured by a sub-carrier group. In addition, the respective frames transmit a MAP message including frame configuration information at the leading part thereof and then transmit a data burst (the burst being a set of Packet Data Units (PDUs) to be transmitted for the respective users, and the same radio channel parameter is used so as to transmit a single burst). Therefore, the base station 20 for performing wireless management allocates/manages a sub-channel to transmit/receive the respective user data every frame, configures the MAP message based on the sub-channel concerning information, and the user terminal 10 receives the MAP message, receives the upstream/downstream data burst information allocated to the base station, and transmit/receives the corresponding data burst.

Generally, in almost all wireless communication systems, the overall efficiency or transmission characteristics thereof largely depends on which scheduling algorithm is used. Therefore, a scheduling algorithm may be chosen according to usage. Representatively, a method for maximizing system transmission efficiency and a method for ensuring fairness between the terminals have been proposed.

The first method can maximize system throughput because almost all radio resources are allocated to the terminal having the best channel state. However, there is a problem in that the terminal having a poor channel state may have sufficient service because the radio resources are not allocated regardless of a large amount of data to be transmitted.

The second scheme can fairly allocate a radio resource to all terminals regardless of the channel states because it uniformly allocates radio resources to all the terminals. However, the second scheme has a drawback in that the system throughput may be decreased because a large amount of resources is allocated to terminals having a poor channel state. That is, these two methods each have a fatal drawback. Therefore, recently, wireless systems prefer a proportional-fairness (hereinafter, called "PF") scheme for enhancing system throughput by means of a system throughput/fairness trade-off. However, the PF scheme has a drawback in that each user's different QoS requirements and real-time service are not considered.

The conventional wireless communication system supports a single service. However, the WiBro system supports various multi-media services such as a real-time service, a non-real-time service, and the newest service. Therefore, the WiBro system requires scheduling considering each service's QoS requirements. In addition, the scheduler of the WiBro system must determine a proper MCS (Modulation and Coding Scheme) level based on the user channel state according to the requirements of the system applying an AMC (Adaptive Modulation and Coding) scheme so as to ensure wireless transmission. In order to easily realize the WiBro system as well as to solve the above-described problems, scheduling must be performed before frame synchronization because frame synchronization is exactly matched to satisfy the frame-based WiBro system operation conditions and system performance, and a minimum process time must be ensured because the MAP message is configured.

SUMMARY OF THE INVENTION

The present invention has been made in an effort to provide a forward packet scheduling method and apparatus in a base station of a portable Internet system having advantages of increasing system efficiency and fairness according to each user's QoS requirements considering a real-time service by a forward packet scheduler in a base station of the IEEE 802.16 Wireless MAN-based portable Internet (WiBro) system, and reducing a process time.

A forward packet scheduling apparatus according to the present invention includes a packet classifier for analyzing an IP header of an IP packet received from the wired network and determining the corresponding user, connection ID, and a priority;

a storage unit for storing the IP packet received until the wireless period is transmitted;

a scheduler for determining a transmission order according to the priority of the to-be-transmitted data stored at the storage unit, for determining capability of data transmission and a modulation and coding scheme according to the radio channel state, for selecting data to be transmitted every frame selection and capability thereof, for performing wireless period packet transmitting/receiving control, and for performing a wireless frame resource management function; and a PDU generator for receiving PDU generation information from the scheduler, selecting data from the storage unit, generating a MAC PDU and data burst, and transmitting the generated MAC PDU and data burst through the physical layer to the user terminal.

In addition, a forward packet scheduling method in a base station of a portable Internet system including a user terminal for providing a portable Internet service, a base station for supporting an inter-user terminal wireless access and network connection, and a packet access router for performing a mobility control and packet routing function of each user terminal, according to the present invention, includes analyzing an IP header of an IP packet received from a wired network and determining a corresponding user, a connection ID, and a priority; storing the received IP packet until before the wireless area transmission; determining scheduling of an order of the stored data to be transmitted according to the priority, determining a transmission capability of data to be transmitted and a modulation and coding scheme according to a radio channel state by means of subsidiary scheduling and main scheduling, selecting a to-be-transmitted data capability for the respective frames, controlling wireless packet transmitting/receiving, and managing a wireless frame resource; and receiving PDU generation information according to the scheduling, selecting the stored data, generating a MAC PDU and a data burst, and transmitting the generated MAC PDU and data burst to a physical layer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The present invention will hereinafter be described in detail with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 3:
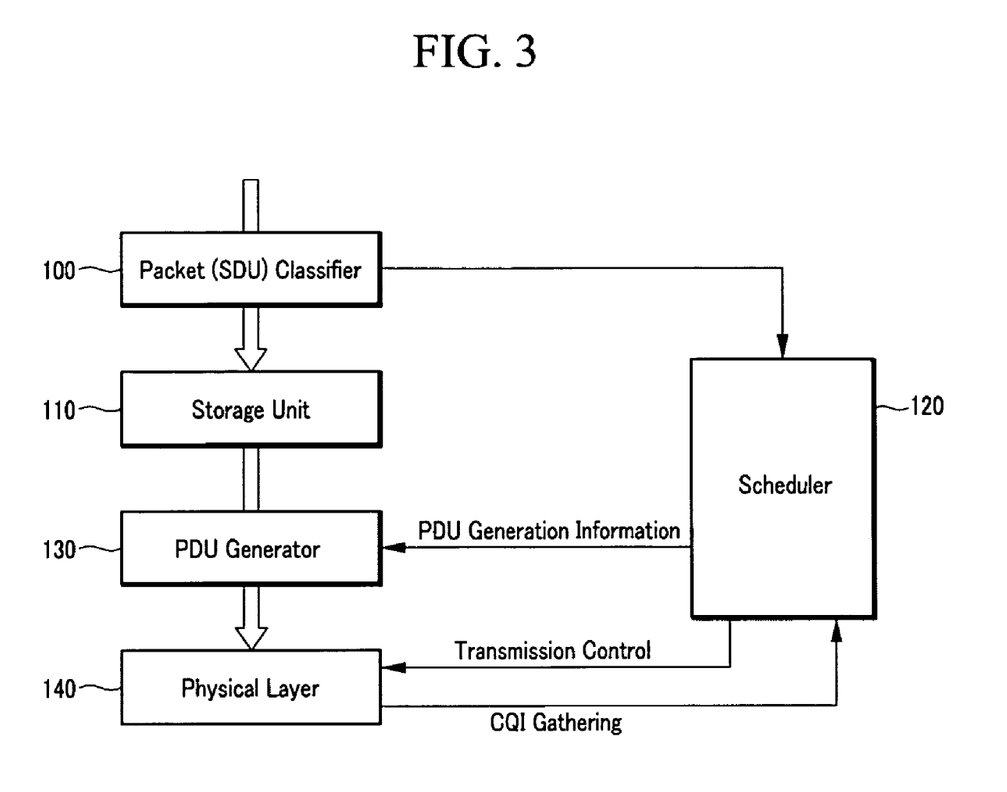
FIG. 3 is a schematic diagram showing a forward packet process module in a base station.

FIG. 3 is a schematic diagram showing a forward packet process module in a base station.

As shown in FIG. 3, a forward traffic process module of the base station (AP) includes a packet (for example, Service Data Unit, SDU) classifier 100, a storage unit 110, a scheduler 120, and a PDU generator 130.

The packet (SDU) classifier 100 analyzes an IP header of an IP packet (SDU) received from the wired network and determines the corresponding user, connection ID, and a priority.

The storage unit 110 stores the received IP packet until the wireless period is transmitted, and is realized as a soft storage unit.

The scheduler 120 (i.e. a forward packet scheduler in the AP) determines a transmission order according to the priority of the transmission data stored in the storage unit 110, determines capability of data transmission and a modulation and coding scheme (MCS) according to the radio channel state, and performs selection of data (and data capability) that the respective frames can transmit, wireless period packet transmitting/receiving control, and a wireless frame resource management function.

The PDU generator 130 receives PDU generation information from the scheduler 120, selects data from the storage unit 110, generates a MAC PDU and data burst, and transmits the generated MAC PDU and data burst to the physical layer 140.

That is, the base station performs scheduling based on the received traffic state information and the respective user radio channel state information, generates frame data by combining the MAC-PDUs, and transmits the frame data to the physical layer 140.

Particularly, the scheduler 120 is placed in the forward traffic process module and determines a transmission order according to the priority of the data to be transmitted, configures an MCS according to the radio channel state, and combines transmission data for the respective user terminal (AT) by generating a MAP message and wireless frame data. That is, a wireless packet transmitting/receiving control and wireless frame resource management function is performed. The scheduler 120 receives buffer state information including the priority of the stored data and data capability from the storage unit 110, receives channel state information from the physical layer 140 by determining the transmission capability of a data block to be transmitted and the MCS and controlling the PDU generator 130 generating the MAC PDU thereby generating a MAC PDU and data burst, and transmits the MAC PDU and data burst through the physical layer 140 to the corresponding user terminal.

Figure 4:
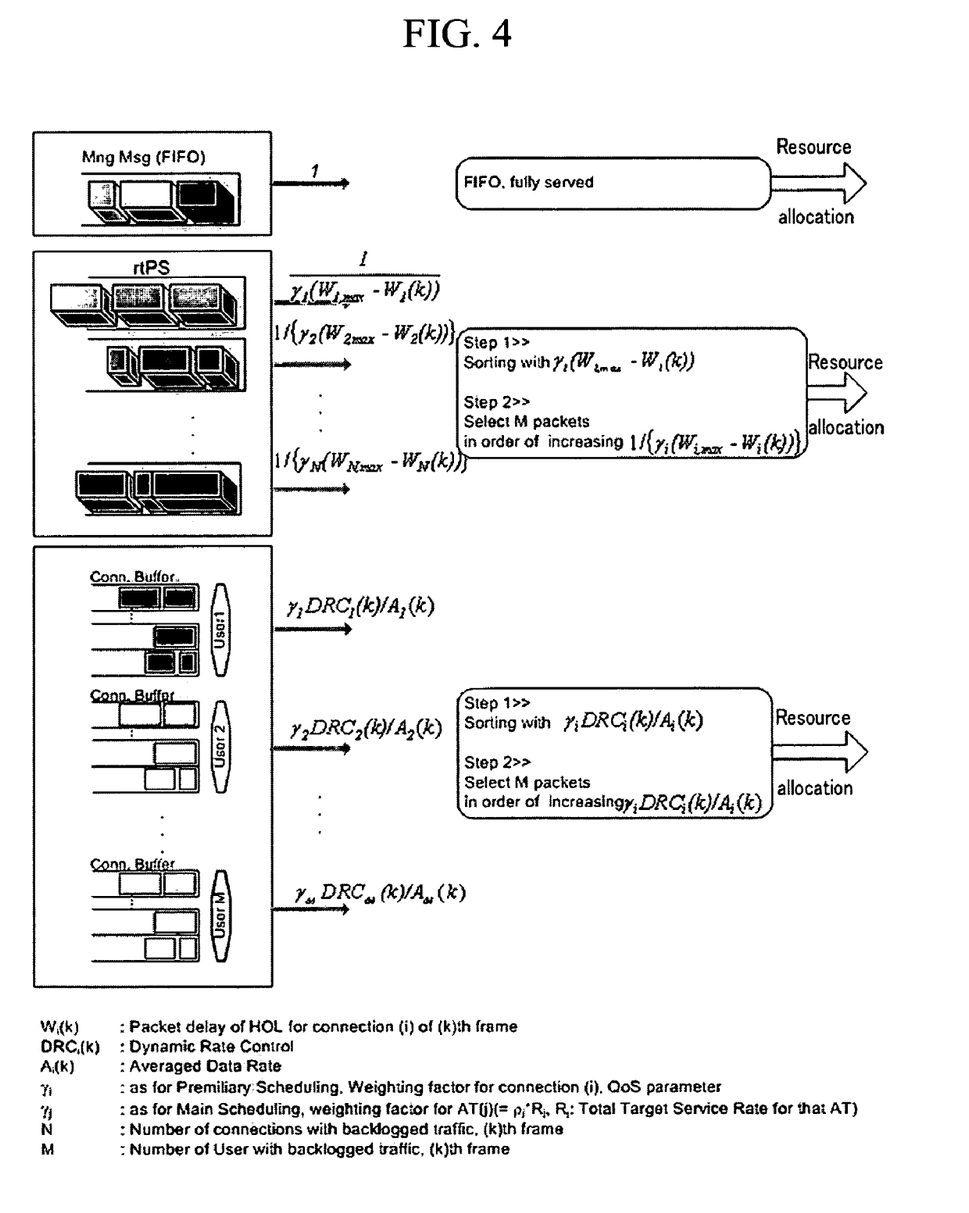
FIG. 4 is a schematic diagram showing an operation of a forward packet scheduler according to the present invention.

FIG. 4 is a schematic diagram showing an operation of a forward packet scheduler according to the present invention.

As shown in FIG. 4, the forward packet scheduler 120 of the base station performs packet-based subsidiary scheduling for considering a real-time service and user-based main scheduling for ensuring fairness and enhancing system throughput. After the two-step scheduling is finished, the frame data generating the PDU of the stored data are transmitted through the physical layer to the wireless area.

According to the present invention, the forward packet scheduler 120 of the base station is operated according to the two step scheduling process as shown in FIG. 4. That is, the forward packet scheduler 120 performs subsidiary scheduling to calculate a service stand-by time priority value for the respective packets that wait for service for the connections supporting the real-time service, provides service of a MAC layer to the packet having a higher priority, and allocates the radio resource. The forward packet scheduler 120 performs user-based main scheduling to calculate a user link state and a used service data speed priority value, determines a service user, and supports a service capability and MAC service and radio resource allocation for the service stand-by connections of the corresponding user. After the scheduler 120 performs the two-step scheduling, it transmits the generated frame data through the physical layer 140 to the wireless area.

Performing forward packet scheduling for a base station of a portable Internet will now be described in detail according to the present invention.

The base station performs scheduling during a predetermined time period every frame. When it enters into the scheduling period, the base station first performs a MAC service and radio resource allocation to a MAC control message between the user terminal and the base station (AT-AP). A service order is determined on an FCFS (First Come First Served) basis. After the control message scheduling is finished, the subsidiary scheduling and main scheduling are performed.

Figure 5:
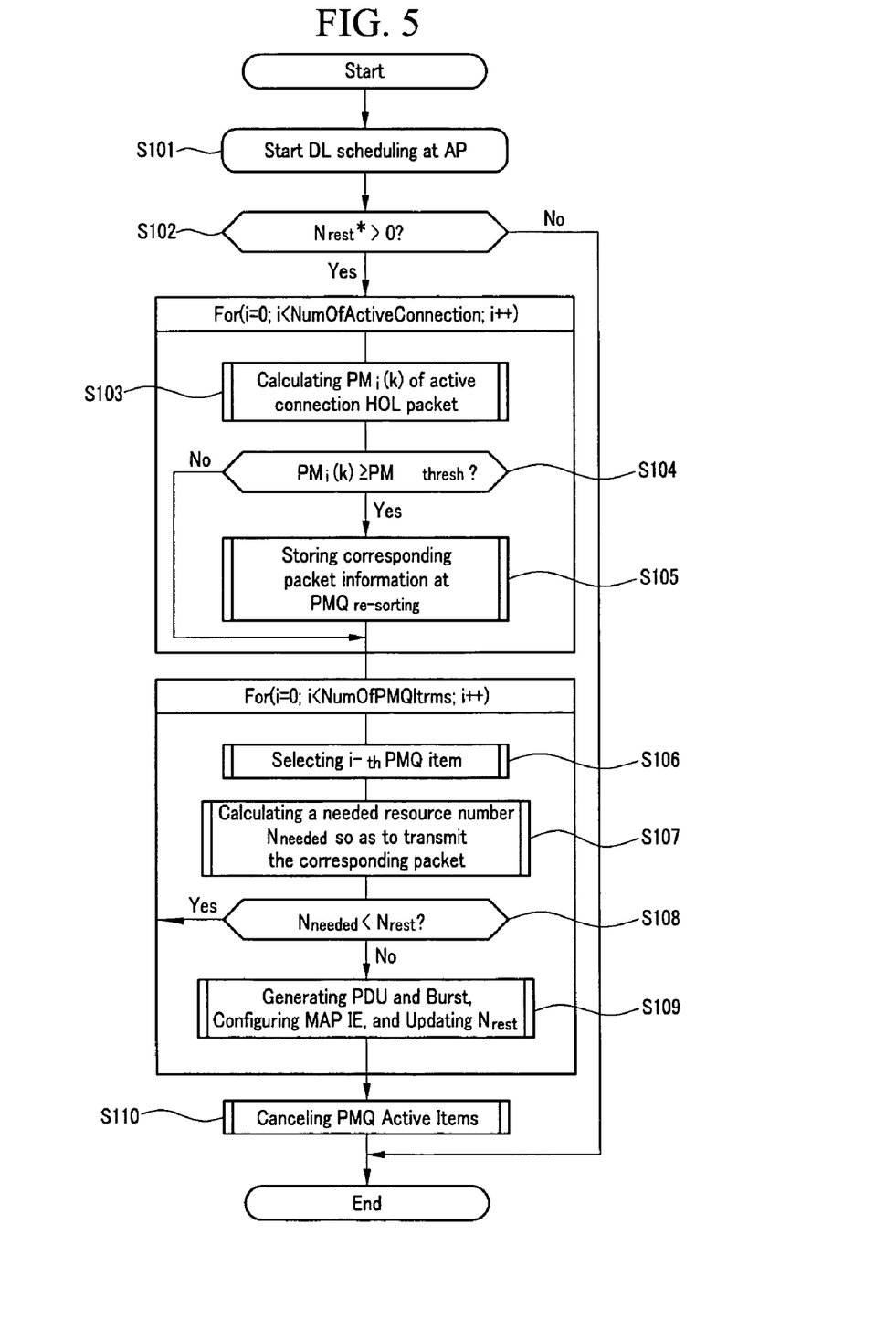
FIG. 5 is a flowchart showing a subsidiary scheduling part in a base station scheduler according to the present invention.

FIG. 5 is a flowchart showing a subsidiary scheduling part of a base station scheduler according to the present invention.

A scheduling rule of a subsidiary scheduling part according to the present invention is expressed as Equation 1.

$$S = \underset{i \in A}{\operatorname{argmax}}\{PM_i(k)\}, \quad (1)$$

condition... $PM_i(k) \geq PM_{threshold}$, for $i \in A$ where,

-continued $PM_i(k)$: Priority Metric for HOL packet in connection ($i$) at the ($k$) service time $PM_{threshold}$: Threshold constant of Priority Metirc Referring to FIG. 5, the scheduler of the base station starts downlink (DL) scheduling in step S101. When the rest sub-channei number Nrest>0, it starts subsidiary scheduling in step S102.

The scheduler calculates a Priority deterMination (PM) variable $PM_i$ from Head-Of-Line (HOL) packets for buffering packets on a connection (i) of an active real-time service in the present cell in step S103. If it is determined that the priority determination variable $PM_i$ is greater than or equal to a threshold value $PM_{threshold}$ in step S104, the corresponding packet information is aligned and stored in a PM queue (PMQ, the PMQ is a list having packet information in a higher PM value order) in step S105. When the priority determination variable $PM_i$ is smaller than a threshold value $PM_{threshold}$, the scheduler stops a PM value calculation for packets of the selected connection and starts a PM value calculation for packets of other connections. The PM value calculation follows Equation 2.

$$P_i(k) = \gamma_i \frac{1}{(W_{i,MAX} - W_i(k))}, \quad (2)$$

$\gamma_i$: Connection ($i$) priority factor $W_{i,MAX}$: Connection ($i$) delay limit $W_i(k)$: Connection ($i$) HOL packet delay When the PM value calculation is finished for all the active real-time service connections (Active Connections), the MAC service and radio resource allocation are performed for packets in a PMQ order. The selected packets are included in the MAC PDU for the wireless area transmission, and it is checked whether the radio resource for the wireless area transmission is allocated. So as to calculate a necessary radio resource allocation, an MCS level is determined according to a user channel state for the primarily selected packet (i-th PMQ item) in step S106. At this time, the MCS level determines a modulation and coding scheme level in an MCS determination table (CQI Threshold-MCS level), which is a cell configuring parameter using channel information (Channel Quality Indicator, "CQI") received from the terminal every frame. The MCS determination table includes a minimum entry channel quality (Minimum Entry Threshold) for respective MCS levels and a mandatory exist channel quality (Mandatory Exit Threshold). The MCS determination table determines an MCS level in which the CQI value is within these threshold values when CQI values of each user terminal are received. When the MCS level of the corresponding user terminal is determined, the needed sub-channel number Nneeded of the wireless frame for servicing data is calculated according to Equation 3 in step S107.

Needed sub-channel number=allocated data size(byte)/ (MODXCR)X6, where MOD: modulation mode factor (QPSK: 2,16QAM:4,64QAM:6) CR: coding rate.

It is then determined whether the needed sub-channel number (Nneeded) is smaller than the rest sub-channel number Nrest of the present frame in step S108. When the needed sub-channel number (Nneeded) is smaller than the rest sub-channel number Nrest of the present frame, the resource allocation for the corresponding packet is finished, and when the needed sub-channel number (Nneeded) is greater than or equal to the rest sub-channel number Nrest of the present frame, capability of service data transmission though the used sub-channel is determined. At this time, when the connection for the corresponding packet may be upper-packet divided, the PDU and burst (Burst) are generated for a part of a transmittable packet, the MAP IE is formed, the rest channel number Nrest is updated, and accordingly the MAC PDU is generated in step S109.

When the MAC service and radio resource allocation for the HOL packet information in the PMQ are finished, the corresponding packet information (PMQ Active items) are deleted in step S110, and then the same processes are repeated for the next packet information. However, during the operation, if there are no radio resources needed, the subsidiary scheduling process stops. The QoS of the real-time service may be guaranteed though such subsidiary scheduling.

Figure 6:
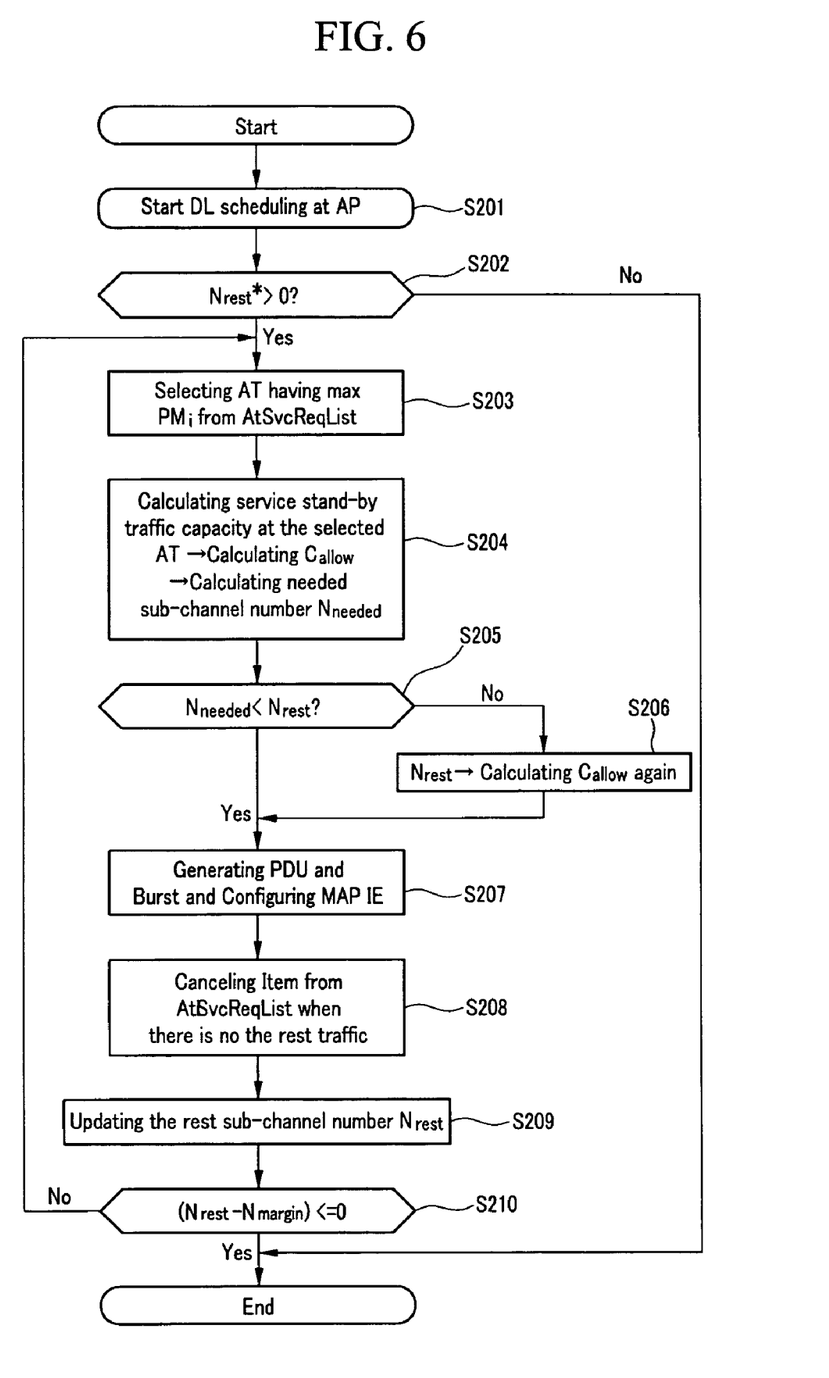
FIG. 6 is a flowchart showing a main scheduling part in a base station scheduler according to the present invention.

FIG. 6 is a flowchart showing a main scheduling part in a base station scheduler according to the present invention.

The user terminal-based main scheduling part is operated as follows. The scheduler of the base station starts downlink packet scheduling (forward packet scheduling) in step S201. When the rest sub-channel number of the present frame Nrest>0 is determined in step S202, the priority determination variable $PM_j$ for the user terminal of a presently active state is calculated and a service is preferentially provided for the terminal having the maximum priority determination variable max PMi among the user terminal service request list AtSvcReqList in step S203.

The scheduling rule and $PM_j$ calculation formula is described with reference to Equation 4.

$$S = \underset{j}{\mathrm{argmax}}\{PM_j(k)\}, \quad (4)$$

$$PM_j(k) = \gamma_j DRC_j(k) / A_j(k),$$

where, $k$: Service Time (Frame Number)

$\gamma_j (= \rho_j \times R_j)$: priority factor for $AT(j)$ $DRC_j(k)$: Current Channel State for $AT(j)$ $A_j(k)$: Avarage Service Rate for $AT(j)$ $R_j\left(= \sum_i r_i, r_i\text{: Target Service Rate for Connection }(i), i \in AT(j)\right)$ : Target Service Rate for $AT(j)$ $P_j$ is a user priority factor negotiated between the base station (AP) and the user terminal (AT) at the registration of a user, and $R_j$ is the sum of service speeds (a minimum service speed negotiated between the base station and the user terminal on the traffic connection configuration) of the present predetermined traffic connections for the user terminal. $DRC_j(k)$ is a variable for indicating a channel state of the present user terminal, and $A_j(k)$ is an average data speed serviced for user (j) thus far.

When the users are aligned in a higher priority determination variable PMj, the needed radio resources are calculated so as to transmit a total capacity of traffic of a service stand-by state with respect to all the predetermined connections to the user terminal having the higher priority determination variable. The needed radio resource calculation for providing a MAC service for the selected user traffic is performed in the same manner as the radio resource calculation method of the subsidiary scheduling part. That is, according to the user's channel state information (CQI), the modulation and coding scheme (MCS) is determined and the needed sub-channel number Nneeded is calculated according to Equation 3 in step S204.

When it is determined the needed sub-channel number Nneeded is smaller than the rest sub-channel number Nrest of the present frame in step S205, the radio resource allocation is finished for all the stand-by packets of the selected user terminal.

That is, the PDU and Burst are generated and the MAP IE is configured until there is no rest radio resource for all the stand-by packets of the selected user terminal in step S207. When there is no rest radio resource, the item is cancelled in the service request list AtSvcReqList of the user terminal in step S208, and the rest sub-channel number Nrest is updated in step S209.

When the needed sub-channel number Nneeded is greater than the rest sub-channel number Nrest of the present frame, the service data capability $C_{allow}$ that is transmittable to the used sub-channel is calculated, the radio resource is allocated to a part of the stand-by traffic, and the MAC PDU is generated in step S206, and steps S207, S208, and S209 are performed.

When there is a rest radio resource ((Nrest−Nmargin<=0)), the same steps S203 to S209 are repeated for the next user terminal in step S210.

The main scheduling part can increase system efficiency as well as guarantee fairness according to each user QoS negotiation specification because it uses an PF algorithm for supporting the inter-user fairness and the optimum inter-system efficiency trade-off considering QoS of each user.

According to the present invention, the priority determination variable calculation for the service stand-by packets is performed while being limited in a real-time service and is performed while being limited to packets having a priority determination variable greater than a threshold value rather than for all the stand-by packets, and the main scheduling uses a user-based priority determination variable calculation and radio resource allocation, thereby reducing an operation time. Since the base station forward packet scheduler of a 5 msec frame-based Wibro system must process scheduling and MAC of high speed traffic within an interval of 5 msec, the minimum of processing time according to the present invention has a great merit.

The recording medium may include all types of recording medium that a computer can read, for example an HDD, a storage unit, a CD-ROM, a magnetic tape, and a floppy disk, and it may also be realized in a carrier wave (e.g., Internet communication) format.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A forward packet scheduling apparatus in an access point (AP) of a portable Internet (WiBro) system, the forward packet scheduling apparatus comprising:
   a packet classifier having means for analyzing an IP header of an IP packet received from a wired network and determining a corresponding user, connection ID, and a priority;

a storage unit having means for storing the received IP packet before the IP packet is transmitted in a wireless period;

a scheduler having means for determining a transmission order of the stored received IP packets to be transmitted according to the priority of the stored received IP packets, for determining a capability of data transmission, for determining a modulation and coding scheme according to the radio channel state, and selecting data to be transmitted every frame and a capability of every frame, for performing wireless period packet transmitting/receiving control, and for performing a wireless frame resource management function; means for transmitting PDU generation information; and a packet data unit (PDU) generator having means for receiving PDU generation information from the scheduler, selecting data from the storage unit, generating a MAC PDU and data burst, and transmitting the generated MAC PDU and data burst through a physical layer to an access terminal (AT), wherein the scheduler performs packet-based subsidiary scheduling and user terminal-based main scheduling, and wherein the subsidiary scheduling includes:

calculating a priority determination variable ($PM_i$) from a Head-of-Line (HOL) packet for packets buffered at a selected connection of an active real-time service in a present cell;

aligning and storing corresponding packet information in a PM Queue (PMQ) list having packet information in a descending order by PM value when the priority determination variable $PM_i$ is greater than or equal to a threshold value;

stopping a PM value calculation for packets of the selected connection and starting a PM value calculation for packets of other active real-time service connections when the priority determination variable $PM_i$ is less than the threshold value;

allocating a MAC service and radio resource to packets in a PMQ order after finishing the PM value calculation, ordering of packets, and determining a Modulation and Coding Scheme (MCS) level according to a user-terminal channel state for a selected packet (i-th PMQ item);

calculating a number of sub-channels in a wireless frame so as to transmit data to be serviced when the MCS level of a selected user terminal AT is determined;

finishing resource allocation to a corresponding packet when a number of sub-channels needed (Nneeded) is smaller than a number of sub-channels remaining (Nrest) of the present frame, and when Nneeded is greater than or equal to Nrest of the present frame, calculating a capability of service data transmission through a sub-channel being used, generating a PDU and data burst for the corresponding packet, configuring a MAP Information Element (MAP IE), updating Nrest, and generating a MAC PDU;

deleting the corresponding packet information when the MAC service and radio resource allocation for a HOL packet information in the PMQ are finished, and repeating the steps for the next packet information; and stopping the subsidiary scheduling when there are no radio resources during operation.

2. The forward packet scheduling apparatus of claim 1, wherein the scheduler is given as a forward packet scheduler in a base station AP.

3. The forward packet scheduling apparatus of claim 2, wherein the scheduler performs scheduling during a predetermined time period every frame in the base station AP, allocates a MAC service and radio resource in an FCFS (first come first served) order for a MAC control message between the access terminal and the access point, and performs packet-based subsidiary scheduling and user terminal-based main scheduling after scheduling a control message.

4. The forward packet scheduling apparatus of claim 3, wherein the scheduler performs the subsidiary scheduling to calculate a service stand-by time priority value of respective service stand-by packets for connections for supporting a real-time service and provides a service of a MAC layer to the packet having a higher priority value than a reference value, and allocates a radio resource.

5. The forward packet scheduling apparatus of claim 1, wherein the scheduler performs main scheduling to calculate a second priority PMi of each user's link state and a service data rate, determines a service user terminal AT according to the calculated second priority PMi, determines a service capability of service stand-by connections to a corresponding user terminal AT, and supports a MAC service and radio resource allocation.

6. A forward packet scheduling method in a base station of a portable Internet system including a user terminal AT for providing a portable Internet service, a base station AP for supporting an inter-user terminal wireless access and network connection, and a packet access router (PAR) for performing a mobility control and packet routing function of each user terminal AT, the forward packet scheduling method comprising:

analyzing an IP header of an IP packet received from a wired network and determining a corresponding user, a connection ID, and a priority;

storing the received IP packet;

determining scheduling of an order of the stored received IP packets to be transmitted according to the priority of the stored received IP packets, determining a transmission capability of data to be transmitted and a modulation and coding scheme (MCS) according to a radio channel state by means of subsidiary scheduling and main scheduling, selecting a to-be transmitted data capability for respective frames, controlling wireless packet transmitting/receiving, and managing a wireless frame resource; and receiving PDU generation information according to the scheduling, selecting the stored data, generating a MAC PDU and a data burst, and transmitting the generated MAC PDU and data burst to a physical layer, wherein the subsidiary scheduling comprises:

calculating a priority determination variable Priority Determination ($PM_i$) from a Head-of-Line (HOL) packet for packets buffered at a selected connection of an active real-time service in a present cell;

aligning and storing corresponding packet information in a Priority Determination Queue (PMQ) list having packet information in a descending order by PM value when the priority determination variable $PM_i$ is greater than or equal to a threshold value;

stopping a PM value calculation for packets of the selected connection and starting a PM value calculation for packets of other active real-time service connections when the priority determination variable $PM_i$ is less than the threshold value;

allocating a MAC service and radio resource to packets in a PMQ order after finishing the PM value calculation, ordering of packets, and determining an MCS level according to a user-terminal channel state for a selected packet (i-th PMQ item);

calculating a number of sub-channels in a wireless frame so as to transmit data to be serviced when the MCS level of the selected user terminal AT is determined;

finishing resource allocation to a corresponding packet when a number of sub-channels needed (Nneeded) is smaller than a number of sub-channels remaining (Nrest) of the present frame, and when Nneeded is greater than or equal to Nrest of the present frame, calculating a capability of service data transmission through a sub-channel being used, generating a PDU and data burst for the corresponding packet, configuring a MAP Information Element (MAP IE), updating Nrest, and generating a MAC PDU;

deleting the corresponding packet information when the MAC service and radio resource allocation for the FIOL packet information in the PMQ are finished, and repeating the steps for the next packet information; and stopping the subsidiary scheduling when there are no radio resources during operation.

7. The forward packet scheduling method of claim 6, wherein the PM values are determined as follows:

$$P_i(k) = \gamma_i \frac{1}{(W_{i,MAX} - W_i(k))},$$

$\gamma_i$: Connection (i) priority factor $W_{i,MAX}$: Connection (i) delay limit $W_i(k)$: Connection (i) HOL packet delay.

8. The forward packet scheduling method of claim 6, wherein the MCS level determines a modulation and coding scheme level in an MCS determination table as a cell configuring parameter using a channel quality indicator (CQI) received from the user terminal every frame.

9. The forward packet scheduling method of claim 6, wherein Nneeded is calculated so as to allocate radio resources to a stand-by traffic capability on all connections (i) of an active real-time service for the selected user terminal AT as follows:

Nneeded=allocated data size(byte)/(MODXCR)X6, where MOD: modulation mode factor(QPSK:2, 16QAM:4,64QAM:6)

CR:coding rate.

10. The forward packet scheduling method of claim 6, wherein the main scheduling comprises:

starting forward (downlink) packet scheduling in the scheduler of the base station AP and calculating a priority determination variable $PM_j$ of the user terminal AT of a presently active state when Nrest of the present frame>0;

providing a priority service to the user terminal AT having the maximum priority determination variable (max PMi) in a user terminal service request list AtSvcReqList;

aligning the user terminals in a higher priority determination variable PMj order, calculating radio resources needed to provide a MAC service to the selected service stand-by traffic on all connections configured to the user terminals having a higher priority determination variable PMj order, determining an MCS according to a user's channel state information, and calculating Nneeded;

generating a PDU, burst, and MAP IE until there is no remaining radio resource for all stand-by packets of the selected user terminal AT when Nneeded of needed sub-channels is less than Nrest of the present frame, canceling items in the service request list AtSvcReqList of the user terminal, updating Nrest, and allocating a radio resource;

when Nneeded is greater than Nrest of the present frame, calculating the service data capability $C_{allow}$ that is transmittable to the used sub-channel, allocating the radio resource to a part of the stand-by traffic, and generating a MAC PDU; and repeating the same process for the next user terminal AT, when there is a remaining radio resource.

11. The forward packet scheduling method of claim 10, wherein the maximum priority determination variable (max Pmi) is determined as follows:

when $P_j$ is a user priority factor negotiated between the base station AP and the user terminal AT on the registration of a user, $R_j$ is the sum of service speeds (a minimum service speed negotiated between the base station and the user terminal on the traffic connection configuration) of the present predetermined traffic connections for the user terminal, $DRC_j(k)$ is a variable for indicating a channel state of the present user terminal, and $A_j(k)$ is an average data speed serviced for user, $$S = \underset{j}{\operatorname{argmax}}\{PM_j(k)\},$$

$$PM_j(k) = \gamma_j DRC_j(k)/A_j(k),$$

where, k: Service Time (Frame Number)

$\gamma_j ( = \rho_j \times R_j)$: priority factor for $AT(j)$ $DRC_j(k)$: Current Channel State for $AT(j)$ $A_j(k)$: Avarage Service Rate for $AT(j)$ $R_j\left( = \sum_i r_i, r_i\text{: Target Service Rate for Connection }(i), i \in AT(j)\right)$ : Target Service Rate for $AT(j)$.

12. The forward packet scheduling method of claim 11, wherein the MCS is determined by channel state information received through an uplink frame, and a sub-carrier data rate every second is determined so as to determine $DRC_j(k)$ for indicating a channel state of the present user terminal.

13. The forward packet scheduling method of claim 10, wherein the repeating step includes calculating allowable data capacity of remaining radio resources when the needed radio resource for transmitting data to the selected user terminal AT is smaller than the remaining radio resources, and providing a MAC service for the limited data.

* * * * *